April 14, 1964
D. I. D. MAYERS
3,128,735
WELDING JIG
Filed July 17, 1961
2 Sheets-Sheet 1
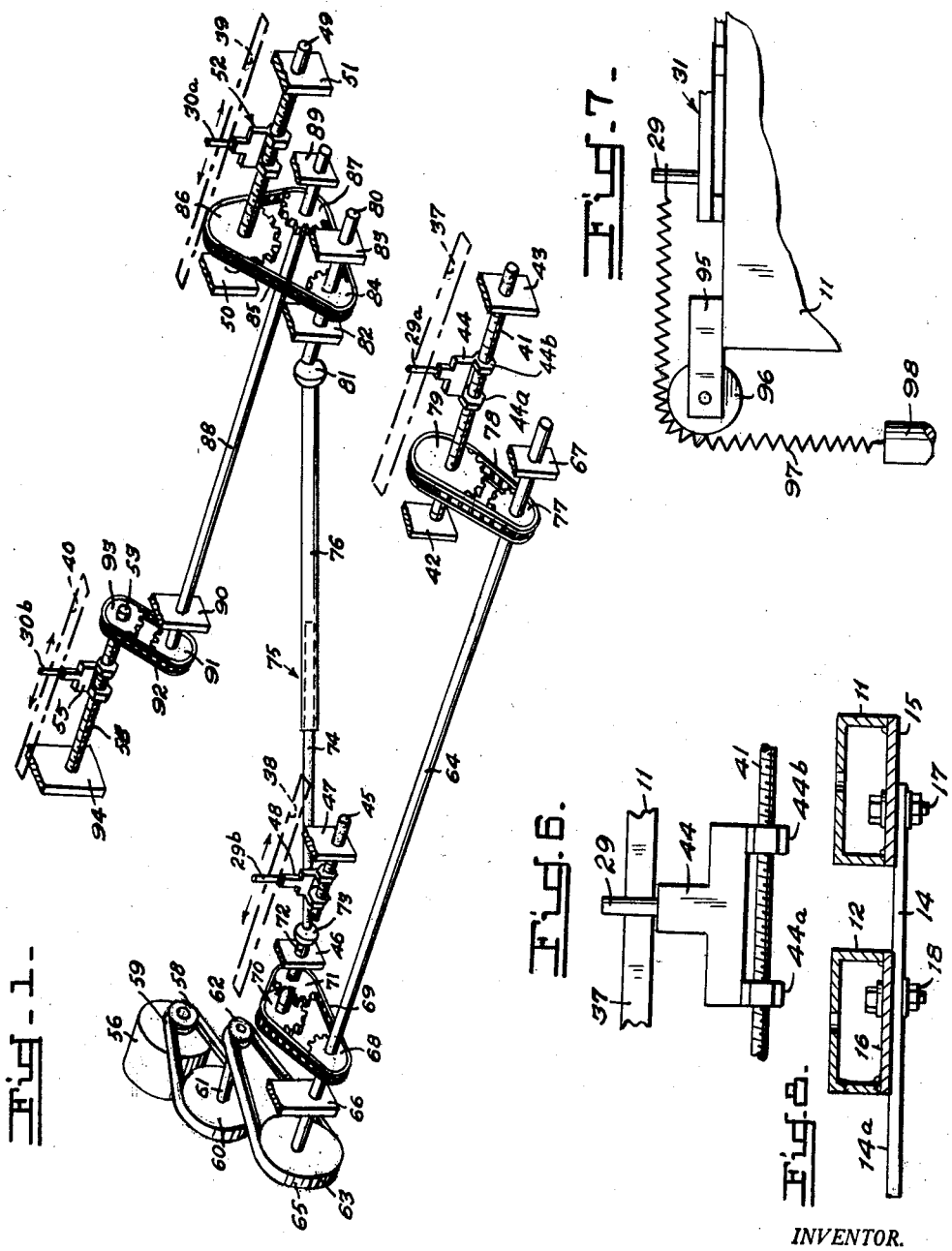
INVENTOR.
David I. D. Mayers
BY
Elizabeth Newton Dew
Attorney.

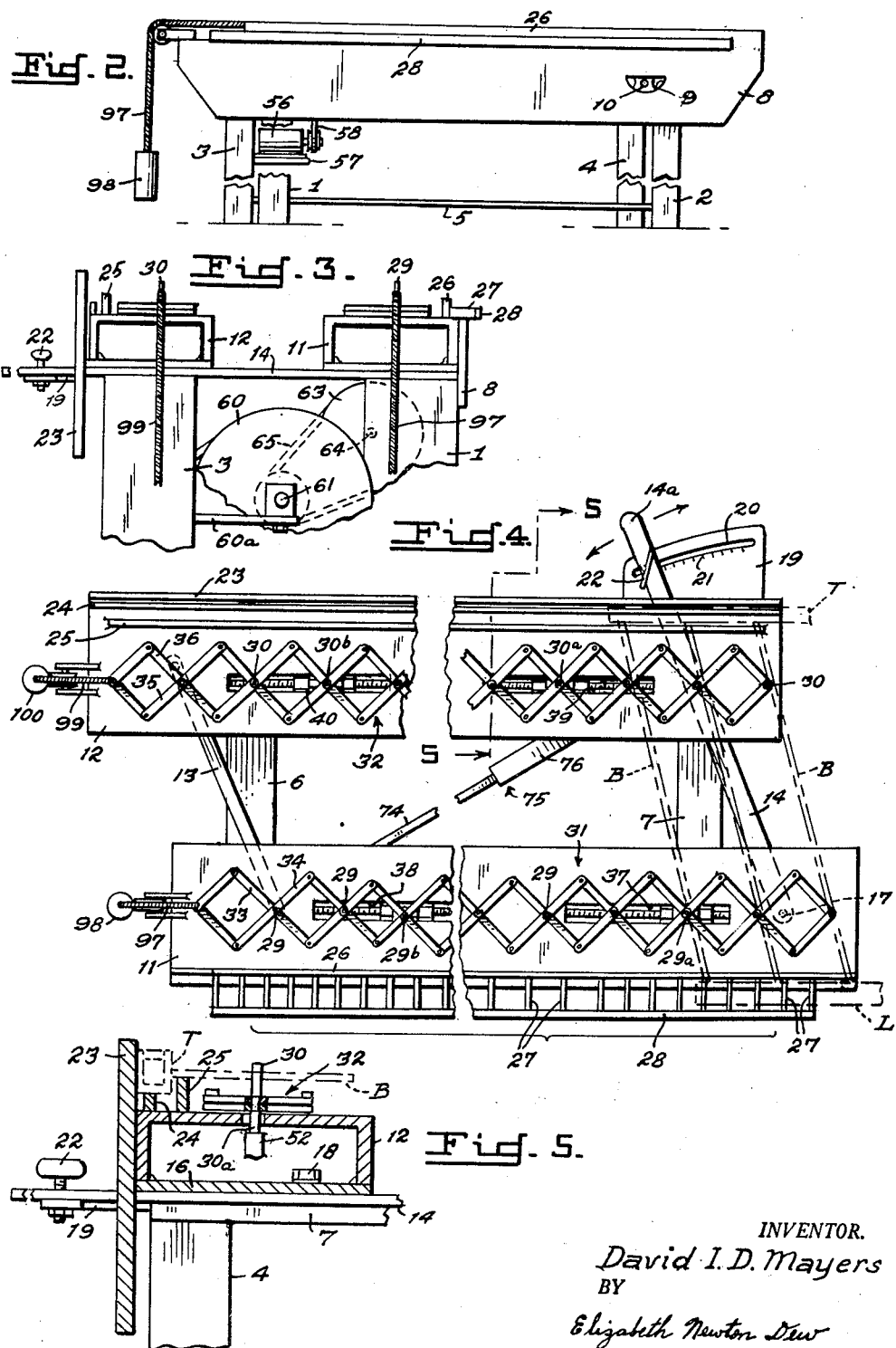

United States Patent Office 3,128,735
Patented Apr. 14, 1964

3,128,735
WELDING JIG
David I. D. Mayers, Box 9456, Richmond 28, Va.
Filed July 17, 1961, Ser. No. 124,421
17 Claims. (Cl. 113—99)

This invention relates to jigs and, more particularly, to welding jigs for correctly positioning metal parts to be welded together and to maintain them in such position during welding.

It is the principal object of my invention to provide a jig for relatively and correctly positioning the top and bottom rails and the interspaced balusters of railings, horizontal or sloping, and for maintaining them in such position during the time they are welded or otherwise united into an integral structure.

A further object is to provide a welding-up jig as described in the preceding paragraph, which is highly versatile in use because of its quick, simple and easy adaptation to a wide variety of rail and baluster spacings, and a correspondingly wide range of angles of the balusters relatively to the rails and their distance of separation.

Another object is to provide a jig of the character stated, which operates automatically to locate and positively determine the uniform even spacing of all balusters of a given installation, with a single setting of the instrument.

Still another object is to provide a jig of the type noted which, with linear dimensions of the rails given, will automatically determine the proper and uniform spacing of a selected number of balusters to be welded or otherwise secured to the rails. Such problems arise, for example, where a railing is to extend along a ramp, or where balusters of a horizontal railing are to be spaced to match the spacing of a continuing stair railing.

Yet another object is to provide a jig of the type aforesaid, which can be made up in a wide variety of sizes and capacities, is simple and reliable in use and operation, effects large savings in the time previously required to weld up and complete a floor, walk, stair or ramp railing, and which is a general advance in the art.

Another object is to provide a jig for welding-up grills and other constructions wherein a plurality of bars or rods are to be fixed in spaced parallel relation, to top and bottom rails.

Other objects and advantages of the invention will become apparent to those skilled in the art, after a study of the following description in connection with the accompanying drawing.

In the drawing:

FIGURE 1 is a perspective detail view, with the top tables or supports removed to show the motor-driven mechanism by which the positioning pins are simultaneously and proportionally spaced;

FIGURE 2 is a front elevation to a reduced scale, of the assembled machine;

FIGURE 3 is an elevational view, partly broken away, and to a scale enlarged over that of FIGURE 2, of the machine as seen from the left end thereof;

FIGURE 4 is a broken plan view showing the tables, the means for relatively moving them, and the parallelogram linkages by which the two sets of positioning pins are proportionally spaced;

FIGURE 5 is a section through the rear table, taken in a plane identified by line 5—5, FIGURE 4;

FIGURE 6 is a detail view of one of the four identical pin-adjusting mechanisms used in the model illustrated;

FIGURE 7 is a detail view of one of the two means for yieldingly urging the respective link assemblies into extended positions; and FIGURE 8 is a detail sectional view through the two tables or work supports, just to the left of the operating link-lever connecting them.

Referring particularly to FIGURE 2, 1 and 2 identify a left and right front pair of legs and 3 and 4, a corresponding rear pair, all united into a strong rigid frame, as by welding. This frame includes longitudinal braces one of which, 5, is shown at FIGURE 2, left and right coplanar transverse members 6 and 7, FIGURE 4, and a front apron 8, FIGURE 2, having an opening 9 to afford access to motor control switch 10, subsequently described. In the model illustrated, all parts of the frame are of heavy metal to form a strong rigid support for the operating mechanism and the parts to be welded.

A front table or support 11 is fixed to the members 6 and 7. Rear table or support 12 rests on these members for free sliding movement. Both tables are conveniently formed of heavy metal channels, inverted to present horizontally coplanar upper surfaces.

As best shown upon FIGURE 4, the tables 11 and 12 are connected by parallelogram links 13 and 14, each pivotally connected with short, relatively narrow cross bars welded to their lower channel edges. Two of these bars are identified at 15 and 16, FIGURE 8, where it is noted that link 14 is pivoted at 17 to bar 15, and at 18 to bar 16, at the right end of the machine. Link 13 similarly pivotally connects the tables at their left ends. Link 14 extends to the rear, outwardly beyond table 12, to provide an operating handle 14a. A sector plate 19 secured to table 12 just below this handle, has an arcuate slot 20 therein coaxial of pivot 17. Angular graduations 21 along this slot, in cooperation with an indicium on the handle, provide an indication of the angle which each pair of positioning pins above the two tables, make with the longitudinal axes of the tables and with the guide rails supported thereby, as and for a purpose subsequently described. A thumb screw 22 is provided to releasably lock link 14 to plate 19 in adjusted position. By this construction, screw 22 may be loosened, handle 14a swung to the desired angular position as indicated upon scale 21, and again fixed. Due to the parallelogram construction thus provided, table 12 may be shifted longitudinally with respect to table 11, while being maintained in coplanar relation therewith.

Referring especially to FIGURE 5, table 12 has a metal backing plate 23 secured to its rear vertical surface, so that a portion thereof upstands above the top surface to form an abutment or positioning means for a top rail T to be welded. A longitudinal support bar 24 is positioned on and over the top of table 12, a little ahead of plate 23 and, as depicted upon FIGURE 5, supports rail T at the proper elevation for welding when the rail is in abutment with the plate. In actual practice it is intended that bar 24 will be vertically adjustable over a range sufficient to support rail T at the correct elevation with respect to balusters B, for all widths of rails encountered in practice. A simple way to effect this is by threading a number of screws through holes spaced in table 12 along and beneath bar 24, each having its upwardly-projecting end smoothly fitting a corresponding hole in the under side of the bar. Numerous other ways of effecting this adjustment will occur to those skilled in the art.

A bar or strap 25 is fixed to the top surface of blade 12 in advance of and parallel with bar 24. Bar 25 has its top edge above that of bar 24 and forms a support for the top ends of balusters during welding. FIGURE 5 shows the relative positions of the parts in a typical set-up.

Front table 11 has a support assembly secured to and along its front edge. This includes a bar or strap 26, FIGURES 3 and 4, of the same elevation as strap 25 to support the lower ends of balusters B. A number of short bars 27 are fixed to the table 11 in equally- and closely-spaced relation, to extend horizontally normal to strap 26 so that their top surfaces define a horizontal plane of the proper elevation to accurately support and position the lower rail L of the rail assembly, relatively to the balusters thereof, jointly supported by straps 25 and 26. The front ends of these bars are conveniently connected by a strap 28 having its upper edge coplanar therewith. Bars 27 have a length sufficient to support the lower rail of the assembly to be welded, over a range of baluster lengths encountered in practice.

Each of the tables 11 and 12 has a series of equally-spaced positioning pins or abutments mounted in erect position along its length. The pins of table 11 are identified at 29 and those of table 12 at 30. See FIGURE 4. Pins 29 are interconnected for simultaneous proportional adjustment by a parallelogram linkage 31. Each pin forms the central pivotal connection, for its respective pair of crossed links, all of which are equal. Similarly, pins 30 are connected by a like linkage 32. For example, referring to FIGURE 4, pin 29 forms the pivotal connection for its pair of crossed links such as 33, 34, over table 11. Likewise, each pin 30 forms the pivotal connection for its pair of links such as 35 and 36, over table 12.

Means are provided to simultaneously expand and contract the two linkages to correspondingly vary the spacing of the pins. For this purpose table 11 has central aligned slots 37 and 38 through its surface while table 12 has slots 39 and 40, right and left. Each of these four slots has a threaded shaft journaled below it, for rotation on an axis parallel therewith. The two shafts of each table are aligned; and since all are similarly mounted and journaled, a description of one will suffice. Referring to FIGURES 1 and 6, shaft 41 lies beneath slot 37 in table 11 and has its ends journaled in bearings 42 and 43 welded or otherwise secured to the under surface of the table. A slide assembly 44 has spaced extensions which are threaded to engage the shaft. In the model shown, this slide consists of a simple metal plate in the shape of an inverted T, with nuts 44a and 44b welded to and depending from the termini of its arms, and pin 29a fixed with and upstanding from the leg of the T and extending upwardly with a smooth sliding fit through slot 37. Thus, rotation of the screw effects translation of pin 29a along the slot. For convenience of identification, the one pin projecting through slot 37 is identified as 29a. Similarly the pins projecting through slots 38, 39 and 40 have been designated 29b, 30a and 30b, respectively, it being understood that only one pin projects through each slot. Since all threaded shafts are alike, except for lengths, and are similarly journaled, it is sufficient to identify shaft 45, partly broken away in FIGURE 1, for clarity of disclosure, and journaled in bearings only one of which, 47, appears in FIGURE 1, and its slide assembly 48 including pin 29b. Shafts 41 and 45 are aligned.

Also identified in connection with table 12, are shaft 49 journaled in bearings 50, 51, and its slide assembly 52 including pin 30a, shaft 53, one bearing 94 thereof, and its slide assembly 55, including pin 30b. The right bearing of shaft 53 has been omitted in FIGURE 1 to avoid obscuring parts subsequently described. It is noted at this time, first, that the link mechanisms 31 and 32 are preferably identical as to size and number of links in each, secondly, that the abutment-pivot pins such as 29a and 29b, for example, extending through slots 37 and 38, respectively, are widely spaced, with a number of pins 29 interposed between them and, thirdly, that there are a number of such abutment-pivot pins spaced outwardly to the right of pin 29a and to the left of pin 29b, as the parts are viewed upon FIGURE 1. The specific number of such pins will depend upon the maximum length of railing which the jig is intended to hold for welding.

Mechanical connections are provided to rotate all four of the threaded shafts in synchronism, so that pins 29a and 30a are adjusted equally at a first rate and pins 29b and 30b are simultaneously and equally adjusted at a second rate greater than the first and bearing a fixed ratio thereto. In the model shown, this ratio is 2:1. For this purpose a reversible motor 56 is mounted on a bracket 57, FIGURE 2, carried by left rear leg 3 and having a V-pulley 58 connected by belt 59 with a pulley 60 fixed to an idler shaft 61. A smaller pulley 62 is also fixed to shaft 61 and drives a large pulley 63 fixed on shaft 64, through V-belt 65. The speed reduction thus effected is not critical and will depend upon the speed of motor 56 and the desired rate of movement of the pins, say ¼" per second for pins 29b and 30b. Idler shaft 61 is journaled upon a bracket 60a, FIGURE 3, carried by leg 3 and adjustable to vary the tension in belts 59 and 65.

Shaft 64 extends longitudinally along and beneath table 11 and is journaled in left and right bearings 66 and 67, both fixed with the under surface of the table. At its left end as seen in FIGURE 1, shaft 64 has a sprocket 68 secured to it, and connected by chain 69 with a first driven sprocket 70 fixed to shaft 45, and a second driven sprocket 71 fixed to a short shaft 72. Shaft 72 is journaled in bearings one of which is identified at 46, and is connected at its inner end, by universal joint 73, with the section 74 of a telescopic shaft 75 fitting a second section 76. Conveniently, section 74 is square in cross section and slidably fits a correspondingly-shaped axial passage in section 76 so that the two are constrained to rotate as a unit but may have relative longitudinal movement. It is noted that in FIGURE 1, shaft 45 is broken away to disclose shaft part 72 lying behind it.

At the right end of table 11, shaft 64 carries a sprocket 77 connected by chain 78 with a sprocket 79 fixed on shaft 41. Sprockets 68, 70, 71 and 77 are all of the same size and, in the model shown, have eight teeth each. Sprocket 79 is larger and has sixteen teeth so that for any given speed of rotation of shaft 64, pin 29a is translated at one-half the speed of pin 29b and in the same direction.

Section 76 of telescopic shaft 75 extends diagonally across to, and beneath the right end of table 12, where it is connected with a stub shaft 80 by a universal joint 81. Shaft 80 is journaled in bearings 82 and 83 secured to the under side of this table, between which it carries a sprocket 84. A chain 85 connects this sprocket with a sprocket 86 fixed on shaft 49 and another sprocket 87 fixed on shaft 88. Shaft 88 extends to the left beneath and along table 12 and is journaled in bearings 89 and 90 fixed to its under surface.

At its left end, shaft 88 has a sprocket 91, connected by chain 92 with a sprocket 93 fixed to shaft 53. This shaft is journaled in a pair of bearings secured to the under side of table 12, only one, 94, being shown upon FIGURE 1. All sprockets except 79 and 86 are of the same size and, as previously explained, may have eight teeth. Sprockets 79 and 86 are alike and in the machine shown have sixteen teeth. Thus, operation of motor 56 translates all pins 29a, 29b, 30a and 30b, synchronously in the same direction but, due to the larger size of sprockets 79 and 86, pins 29a and 30a travel at a slower rate which, in the model shown, is one-half that of pins 29b and 30b.

Means are provided to yieldingly urge the linkages 31 and 32 leftwardly as viewed upon FIGURE 4. Referring to FIGURE 7, the left end of table 11 has a bracket 95 secured to and extending outwardly therefrom and journaling a grooved pulley 96. A coil spring 97 has one end attached to the left pin 29 of linkage 31 and extends over and about pulley 96. A weight 98 is affixed to the depending end of this spring. The linkage is thereby urged with constant force, into extended position, to thereby take up any play or looseness in the bearings thereof and to assure that all pins are uniformly spaced for all adjustments of the linkages. The linkage over table 12 has a similar arrangement so that, referring to FIGURE 4, it is sufficient to identify spring 99 attached to leftward pin 30, and weight 100 suspended at the lower end thereof.

One of the advantages of my invention is its great versatility. It may be constructed in a wide range of sizes and number of abutment pins in each linkage, while any particular machine, once built, may be used over a wide range of adjustments and conditions required by the job at hand. Furthermore, any given model may be readily altered to one of a larger capacity when and if conditions require. Hence the following description of use is but one of a very large number of ways in which the invention may be usefully employed; and should be read with that fact in mind.

In welding up an iron railing for a flight of steps, the vertical distances of the top and bottom rails above the treads, as well as their vertical separation, are determined by practical considerations. The angle which the rails make with the vertical is determined by ratio of effective tread width to riser dimension and is, in fact arc tan $t/r$, where $t$ is the effective tread width, that is, width minus overhang, and $r$ is the riser dimension. These values are known and are all that are required to adjust the jig to weld up a perfectly fitting and symmetrical railing.

Each pin 29 of linkage 31 forms a pair with a corresponding pin 30 of linkage 32, and the machine is initially assembled and adjusted so that the spacing of the pins of each linkage is the same. When the machine is to be set up and adjusted for a specific job, screw 22 is loosened and, by handle 14a, link 14 is swung until an indicium thereon registers with the aforesaid angle value on scale 21. Screw 22 is then tightened to lock the link or lever in adjusted position. Due to the parallelogram arrangement inherent in the equal effective lengths of levers 13 and 14, this adjustment shifts table 12 and linkage 30 carried thereby, longitudinally with respect to table 11. It is noted that although the adjustment described effects an arcuate movement of each pin 30 about its corresponding pin 29, it is only the component of this movement in the direction parallel with the longitudinal axes of the tables which varies the angle that the line determined by each pair of pins, makes with backing plate 23, for example. In other words, $d = r \cos \theta$, where $d$ is the aforesaid component movement, $r$ is the distance between pivots 17 and 18, and $\theta$ is the angle lever 14 is turned from its position perpendicular to backing plate 23. Hence scale 21 is arcuate about pivot 17, but it is within the purview of the invention to mount table 12 for translation only in the direction of its length. During the aforesaid adjustment, part 76 of telescopic shaft 75 slides over part 74.

The separation of the balusters measured horizontally will, for considerations of symmetry, usually be determined by the effective tread dimension, so that, for example, there will be one baluster in vertical alignment with each riser and one vertically aligned with the mid point of the tread, all being equally spaced. Thus the spacing in such a set-up will be one-half the effective tread width.

A pair of balusters may be temporarily placed, each in contact with an adjacent pair of pins, and switch 10 closed to operate the motor in the proper direction until the balusters are correctly spaced. Due to the construction described, shafts 45 and 53 are driven at the same rate, to equally adjust pins 29b and 30b. Likewise shafts 41 and 49 are simultaneously rotated at the same rate to equally adjust pins 29a and 30a at a speed which, in the model shown, is one-half that of pins 29a and 30b. As a result the linkages 31 and 32 are expanded or contracted as the case requires, by an amount proportional to the difference in linear translation of pins 29b and 30b on the one hand, and pins 29a and 30a on the other. Switch 10 is opened when the balusters have the required spacing. Bar 24 is adjusted to the correct height so that the balusters will be correctly positioned transversely of the top rail T which is then positioned thereon, in contact with backing plate 23. The balusters, pre-cut to proper length and with their ends properly angled, are then positioned, each in contact with a corresponding pair of pins 29 and 30 and, of course, with their upper ends abutting the under surface of the top rail T. Each baluster is then supported at its top by bar 25 and at its lower end by bar 26. The lower rail L is then laid upon bars 27 in contact with the lower ends of the balusters and the entire unit is welded up in situ. The time required for adjustment of the jig for any given job is less than that required to describe it. No computations are required since measurements are made on the spot. Thus the possibility of costly errors is obviated and the time required for set-up and welding is greatly decreased over former practice. Material savings in costs per job are effected.

The foregoing is but one of many ways in which the invention may be usefully employed. As another example, where a railing section of predetermined length is to be welded up for a ramp and is to have a given number of balusters, it is necessary only (a) to adjust the machine for the ramp angle and (b) to operate motor 56 until the number of pins of the linkages corresponding to the selected number of balusters, spans the length of the railing section. The equal and correct spacing of balusters is thus automatically effected without computations. Many other time- and labor-saving uses are possible and will readily occur to those skilled in the art.

As numerous changes, substitutions of equivalents, and modifications will occur to those skilled in the art, after a study of the foregoing description, the specification should be taken in an illustrative rather than a limiting sense; and it is my desire and intention to reserve all changes within the scope of the subjoined claims. In these claims, the terms "horizontal," "horizontally," etc., are for convenience in defining the positions of the parts referred to, as shown upon the drawing, and are not to be taken as limiting the machine to any particular position in actual use.

Having fully disclosed the invention, what I claim and desire to secure by Letters Patent is:

1. A welding jig comprising first and second discrete parallel laterally-spaced supports, means mounting said supports for relative adjustment in the direction of their lengths, first and second sets of object-engaging abutments, each set being carried by a respective one of said supports for movement relative thereto in said direction, and means interconnecting all said abutments for simultaneous and proportional movement on and along said supports.

2. In a welding jig, first and second discrete supports having laterally-spaced, parallel, longitudinal axes, guide means mounting one said support for translatory movement relatively to the other in the direction of said axes, a first plurality of abutments mounted on and projecting from said first support for adjustment therealong, first means connecting all said abutments for simultaneous proportional spacing on said first support, a second plurality of abutments mounted on and projecting from said second support for adjustment therealong, second means connecting all said second plurality of abutments for simultaneous proportional adjustment, and means connecting said first and second means for simultaneous operation and adjustment of all said abutments.

3. A welding jig as in claim 2, all said abutments being equally spaced along the respective said axes, each abutment of said first support forming a pair with a corresponding abutment of said second support to determine a line, translatory movement of said one support varying the angle which said lines make with said axes.

4. A welding jig comprising first and second horizontal, horizontally-spaced parallel supports, said first support being fixed, slide means mounting said second support for translation in the direction of its length relatively to said first support, first and second sets of abutments, each said set upstanding from and spaced along a respective one of said supports, first power-operated means interconnecting the abutments of said first set for proportional variable adjustment on and along said first support, second power-operated means interconnecting the abutments of said second set for proportional variable adjustment on and along said second support, and a power-operated drive connecting said first and second power-operated means to simultaneously vary the spacing of all said abutments for all translatory adjustments of said second support.

5. In a jig for welding railings, a table having a longitudinal axis and a pair of slots therethrough parallel with and spaced along said axis, a pair of screws, each journaled beneath and in fixed relation parallel with a respective one of said slots, a pair of nut elements each threadedly engaging a respective screw, a plurality of abutment pins positioned above said table in equally-spaced relation along said axis, means interconnecting all said pins to vary the spacing thereof while maintaining equal the spacing of each said abutment from contiguous abutments, two of said pins extending through respective ones of said slots and fixed with the nut element therebeneath and means connecting said screws for synchronous differential rotation.

6. In a welding jig, a table, first and second longitudinally-spaced, threaded shafts journaled for rotation on a common axis fixed with said table parallel thereto, a plurality of spaced abutment pins mounted above said table and movable parallel with said axis, means interconnecting all said pins for varying the spacing thereof while maintaining equal the spacing of each said abutment from contiguous abutments, a pair of nut elements each threadedly engaging a respective one of said shafts, two of said abutment pins being connected each with a respective one of said nut elements, and means connecting said shafts for synchronous rotation at rates bearing a fixed ratio other than unity.

7. A welding jig comprising, a frame, first and second parallel supports mounted horizontally and in horizontally-spaced side-by-side relation on said frame, means connected with said second support to translate the same longitudinally with respect to said first support, a first set of abutments carried by and upstanding from said first support in variable spaced relation therealong, a second set of abutments carried by and upstanding from said second support in variable spaced relation therealong, each abutment of one set forming a pair with a corresponding abutment of the other set to determine a line transversely of said supports, and means interconnecting all said abutments and operable to vary the spacing thereof while maintaining equal the spacnig between contiguous abutments of each said set, for all positions of translation of said second support.

8. A jig for welding up railings, comprising, a pair of tables having parallel longitudinal axes and mounted in horizontally coplanar parallel side-by-side relation, frame means mounting said tables for relative translation in the direction of said axes, a vertical rail-positioning means fixed with and upstanding from one said table, a first baluster support bar carried by said one table adjacent and parallel with said rail-positioning means, a rail support carried by said one table between said rail-positioning means and said first baluster support bar and vertically adjustable, a second baluster support bar carried by the other said table in parallel relation with said rail-positioning means, two sets of abutments each mounted to a respective one of said tables in spaced relation along said axes, each abutment of one set forming a pair with a corresponding abutment of the other pair, each said pair of abutments determining a respective one of a plurality of parallel lines making an angle with said rail-positioning means, and means operable to translate said tables relatively, to vary said angle.

9. In a welding jig, a pair of elongated horizontal supports, laterally spaced in parallel side-by-side relation, first and second sets of equally-spaced abutments, each set being disposed over and extending longitudinally along a respective one of said supports and movable therealong, first and second proportional linkage means each interconnecting the abutments of a respective one of said supports, to maintain equal the spacing thereof for all positions of adjustment thereof over and along its support, each abutment of one set forming a pair with a corresponding abutment of the other set, to determine a respective one of a plurality of parallel lines transversely of said supports, first means connected between said first and second linkage means to operate the same and move said abutments to equally change their spacing, and means connected with one said support to move the same longitudinally along and with respect to the other said support, to thereby adjust the angle which said lines make with respect to the longitudinal direction of said supports.

10. In a welding jig, a horizontal support, a first vertical abutment plate fixed with and upstanding from said first support, a first set of abutments upstanding from said first support and equally spaced parallel with and adjacent said plate, a second horizontal support, a second set of abutments upstanding from said second support and equally spaced parallel with said plate, remote therefrom, each abutment of one set forming a pair with a respective abutment of the other set, each pair of abutments determining one of a plurality of parallel lines, and means connected with one said support to shift the same and the set of abutments carried thereby, as a unit parallel with said plate to thereby vary the angle which said lines make with said plate.

11. A welding jig as in claim 10, and means connecting all said abutments and operable to equally vary the spacing thereof for all positions of said one set of abutments relatively to the other set.

12. A welding jig as in claim 11, said connecting means including first and second parallelogram linkages, each linkage connecting the abutments of a respective one of said sets, each abutment being carried by the central pivot of a respective pair of crossed links of its linkage.

13. In a jig of the type described, a table having a longitudinal axis and first and second aligned slots therethrough, spaced along said axis parallel therewith, first and second pins each projecting upwardly through a respective one of said slots, means mounted below said table and interconnecting said pins for effecting simultaneous translation thereof, each along its respective slot, at time rates which are different and bear a fixed ratio, a plurality of work abutments positioned over and upstanding from said table in equally-spaced aligned relation along said axis, means interconnecting all said abutments to vary the spacing thereof while maintaining equal the spacing of each abutment from contiguous abutments, said first and second pins being connected with respective ones of said abutments, operation of said interconnecting means varying the spacing of said abutments while translating the same along said axis, relatively to said table.

14. A jig as in claim 13, said interconnecting means comprising a plurality of pairs of crossed links above said table, each said pair being pivoted together at the midportions thereof, the ends of each said pair being pivoted to the respective ends of the links of an adjacent pair, each said abutment being fixed in axial alignment with a corresponding pivot between the links of a respective pair.

15. A jig as in claim 14, a backing plate secured to and upstanding from said table, to present a vertical surface parallel with said axis, a baluster support bar fixed with said table parallel with and adjacent said plate, and a rail support bar interposed between said plate and baluster support bar, and adjustable in height above said table.

16. In a jig of the type described, a table having a longitudinal axis and first and second slots therethrough, spaced along said axis and parallel therewith, a plurality of equally-spaced abutments upstanding from said table in a common plane through said axis, normal to said table, means interconnecting said abutments to vary the spacing thereof while maintaining equal the spacing of each abutment from contiguous abutments, first and second elements beneath said table, each mounted below a respective one of said slots, means connecting said elements for simultaneous translation each along and parallel with its respective slot and at rates bearing a fixed ratio other than unity, each said element being positively connected with a respective one of said abutments.

17. In a jig for welding railings, a table having a longitudinal axis, a parallelogram linkage mounted on said table and comprising a plurality of pairs of equal links, a plurality of pins each interpivoting a respective pair of said links at their mid portions, each said pin having a projecting upper end forming an abutment for a baluster of a railing to be welded, each pair of links having its ends pivoted to the corresponding ends of a contiguous pair of links, all said pins being equally variably spaced in a common plane normal to said table, through said axis, two of said pins, one adjacent each end of said linkage, projecting downwardly through slots in said table, and means mounted beneath said table and interconnecting said two pins, said means being operable to translate said two pins in said plane and along said axis, at different rates of linear movement.

References Cited in the file of this patent

UNITED STATES PATENTS

| | | |
|---|---|---|
| 1,490,608 | Gilmour | Apr. 15, 1924 |
| 1,755,031 | Schmuckler | Apr. 15, 1930 |
| 2,648,896 | Krumm | Aug. 18, 1953 |

FOREIGN PATENTS

| | | |
|---|---|---|
| 750,864 | Germany | June 1, 1944 |